Sept. 20, 1960 F. C. HABERLAND ET AL 2,953,164
MULTIPLE CHAMBER VALVE PLURAL MOTORS
Filed April 29, 1957 4 Sheets-Sheet 1

NEUTRAL

FOR'D. 2 WH. DRIVE

Inventors:
Frederick C. Haberland
and William J. Kundrat
By: Frank C. Parker
Atty.

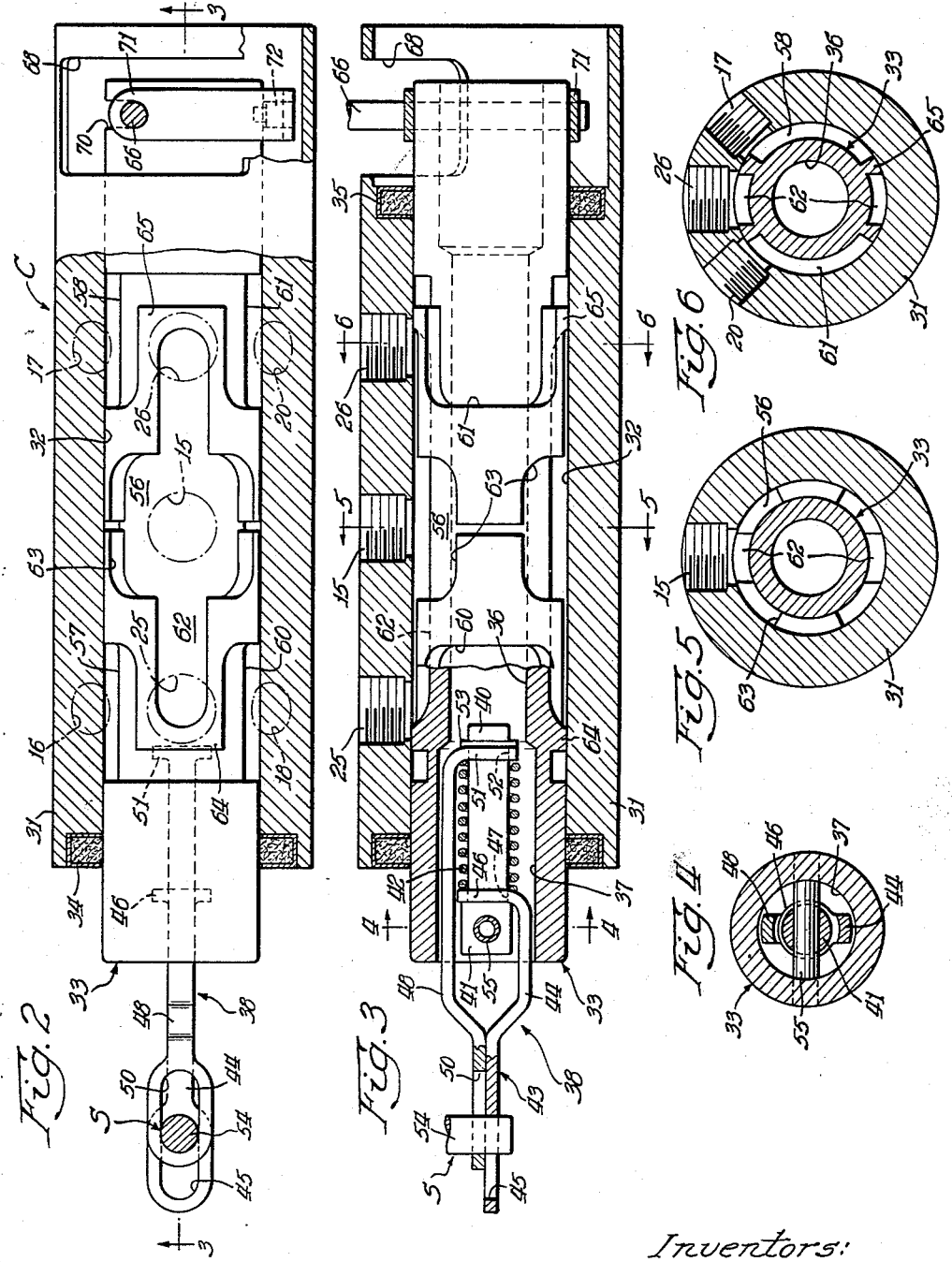

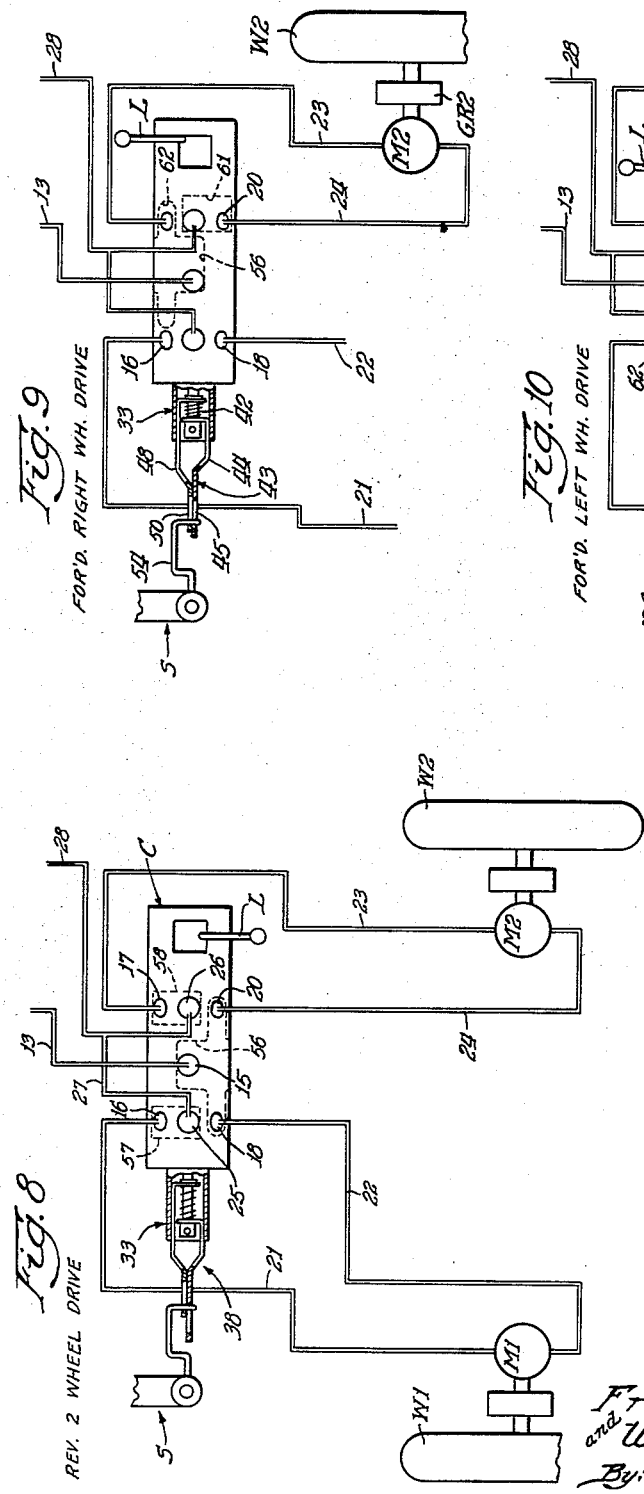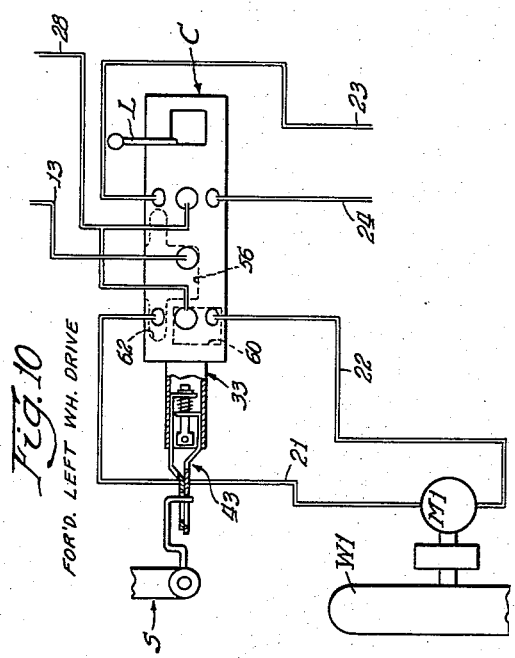

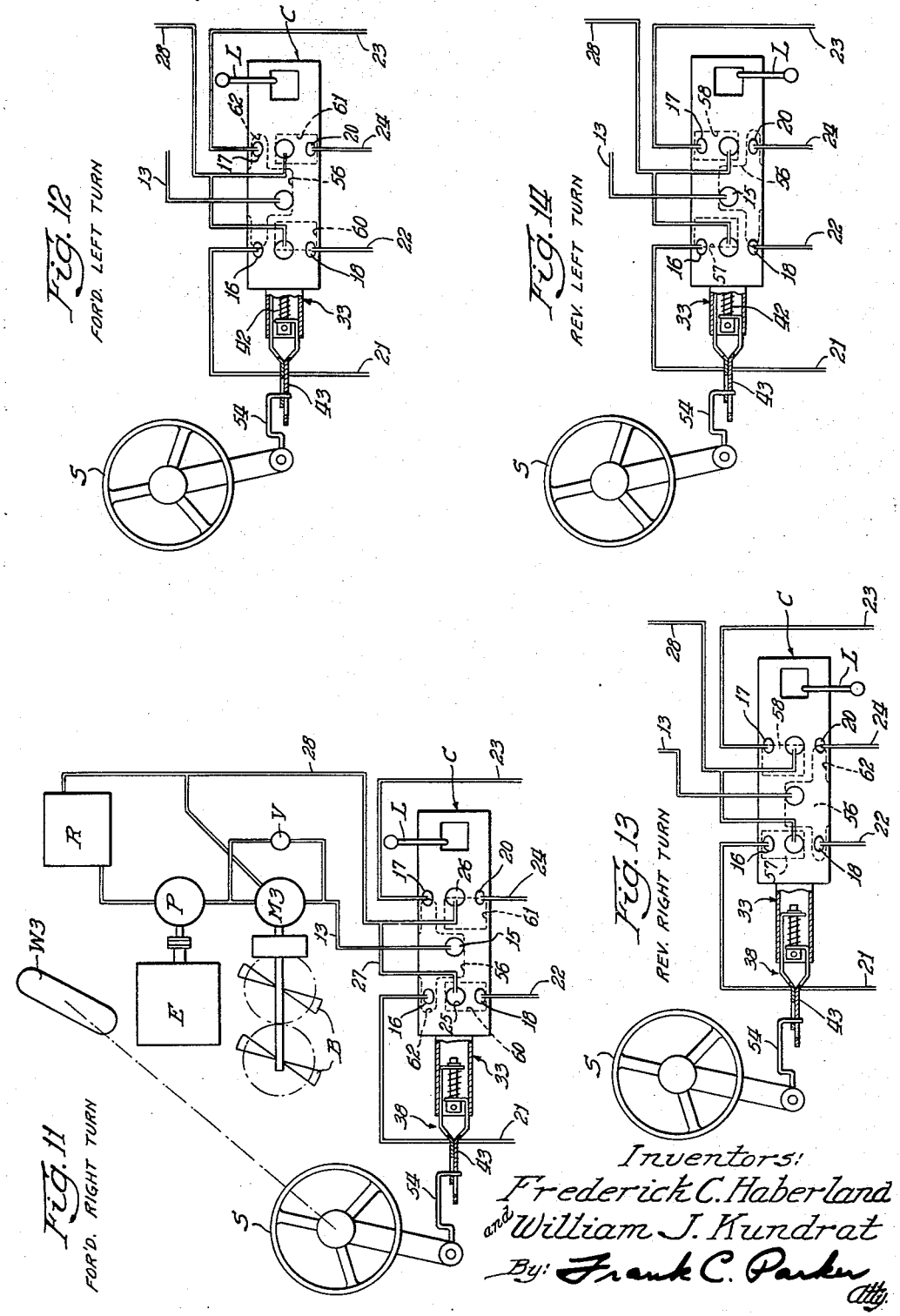

United States Patent Office 2,953,164
Patented Sept. 20, 1960

2,953,164
MULTIPLE CHAMBER VALVE PLURAL MOTORS

Frederick C. Haberland, Cleveland, and William J. Kundrat, Warrensville Heights, Ohio, assignors to Borg-Warner Corporation, Chicago, Ill., a corporation of Illinois Filed Apr. 29, 1957, Ser. No. 655,644

3 Claims. (Cl. 137—622)

This invention relates, in general, to power lawn mowers and in particular to hydraulic drives for power lawn mowers.

It is a general object of this invention to provide a new and improved power lawn mower, particularly of the riding type, and it is a particular object of this invention to provide a new and improved hydraulic drive for such lawn mowers.

Still another and more particular object of this invention is to provide a new and improved differential control valve for a hydraulic system which provides the hydraulic drive for power lawn mowers.

These general and particular objects are accomplished by the provision of a hydraulic system in a power lawn mower which distributes, through a new and improved differential control valve, fluid under pressure from an engine driven hydraulic pump to a pair of hydraulic motors to drive a pair of traction wheels. Through the operation of the differential control valve, the operator of the power lawn mower may choose between one or two wheel drive, in forward or reverse directions, of movement; the power lawn mower being further provided with differential action when turning and a means of restoring traction should one wheel start spinning.

This differential control valve comprises a spool valve having fluid pressure passageways formed of a selected shape and size which cooperate with the inlet and outlet ports of the valve housing to distribute fluid under pressure from the hydraulic pump to the hydraulic motors which drive the wheels. The size and shape of the fluid pressure passageways are selected to provide variable orifices by their cooperation with the outlet ports so that the flow to a selected wheel may be restricted according to the desired requirements of the wheel. This brief resume of this invention will be more completely understood from the more detailed description herein.

Accordingly, it is a still more particular object of this invention to provide in a power lawn mower a new and improved differential valve which permits the choice of one or two wheel drive in forward or reverse directions, which provides differential action when turning the power lawn mower, and which has a means of restoring traction should one wheel start spinning.

Another goal of this invention is the provision of a differential valve having fluid pressure areas of a selected size and shape which cooperate with the inlet and outlet ports to select the amount and direction of flow through these ports according to the requirements of the hydraulic motors which drive the wheels of the power lawn mower.

Other and more particular objects and advantages of the present invention will be apparent from the following detailed description thereof taken in conjunction with the accompanying drawings wherein:

Fig. 2 is an enlarged plan view, partly in section, showing to advantage the differential control valve of this invention;

Fig. 3 is a sectional view of the differential control valve taken along line 3—3 of Fig. 2 and looking in the direction of the arrows;

Fig. 4 is a cross-sectional view of the differential control valve taken along line 4—4 of Fig. 3 and looking in the direction of the arrows;

Fig. 5 is a cross-sectional view of the differential control valve taken along line 5—5 of Fig. 3 and looking in the direction of the arrows;

Fig. 6 is a cross-sectional view of the differential control valve taken along line 6—6 of Fig. 3 and looking in the direction of the arrows;

Fig. 8 is a semi-schematic, partial plan view of the power lawn mower showing to advantage the position of the fluid pressure areas of the differential control valve as they cooperate with the inlet and outlet ports for reverse movement, two wheel drive, of the power lawn mower;

Fig. 9 is a semi-schematic, partial plan view of the power lawn mower showing to advantage the position of the fluid pressure areas of the directional control valve as they cooperate with the inlet and outlet ports for forward movement of the power lawn mower with right wheel drive only;

Fig. 10 is a semi-schematic, partial plan view of the power lawn mower showing to advantage the position of the fluid pressure areas of the directional control valve as they cooperate with the inlet and outlet ports for forward movement of the power lawn mower with left wheel drive only;

Fig. 11 is a semi-schematic, partial plan view of the power lawn mower showing to advantage the position of the fluid pressure areas of the directional control valve as they cooperate with the inlet and outlet ports for forward right turn of the power lawn mower with differential flow to the right wheel;

Fig. 12 is a semi-schematic, partial plan view of the power lawn mower showing to advantage the position of the fluid pressure areas of the directional control valve as they cooperate with the inlet and outlet ports for forward left turn of the power lawn mower with differential flow to the left wheel;

Fig. 13 is a semi-schematic, partial plan view of the power lawn mower showing to advantage the position of the fluid pressure areas of the directional control valve as they cooperate with the inlet and outlet ports for reverse right turn of the power lawn mower with differential flow to the right wheel;

Fig. 14 is a semi-schematic, partial plan view of the power lawn mower showing to advantage the position of the fluid pressure areas of the directional control valve as they cooperate with the inlet and outlet ports for reverse left turn of the power lawn mower with differential flow to the left wheel.

Figure 1:
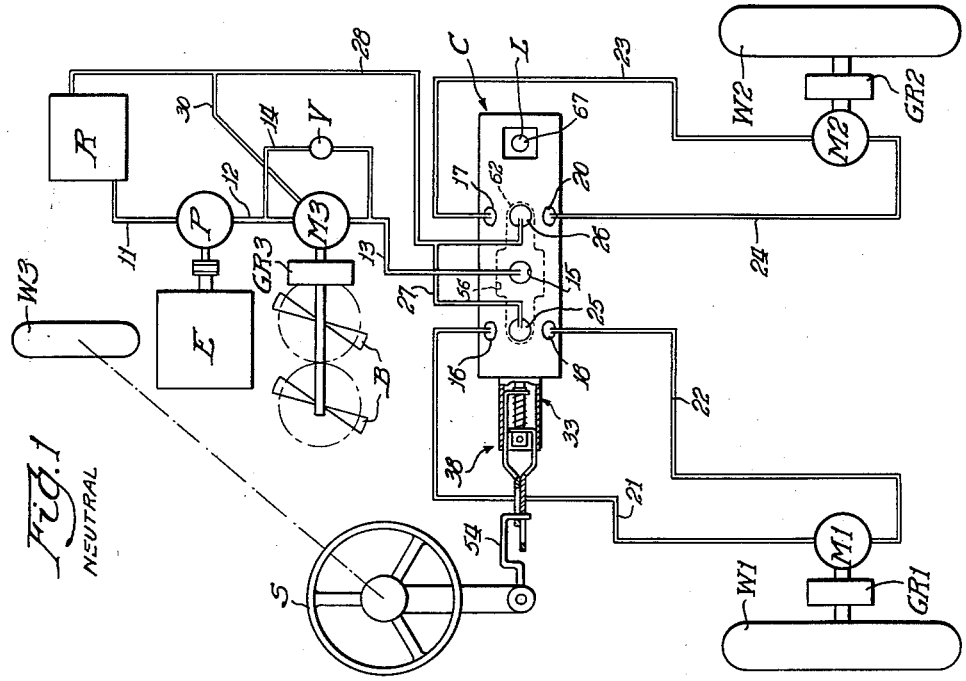
Fig. 1 is a schematic plan view showing to advantage the differential control valve as it is connected hydraulically into the various elements of a power lawn mower.

Referring now to the drawings and in particular, to Fig. 1 thereof, it can be seen that there is disclosed a partially schematic plan view of a three-wheel power lawn mower wherein the left and right wheels W–1 and W–2, respectively, are each suitably driven through gear reduction means GR–1 and GR–2, by hydraulic motors M–1 and M–2 to cause the power mower to move forward or reverse. The front or steering wheel W–3 is mechanically coupled in any convenient manner to a steering wheel S to provide steering control by turning the steering wheel to the right or to the left. One of the many types of conventional mechanical connections that may be utilized is fully disclosed in the United States patent to Worthington et al. No. 2,762,446. These wheels support engine E, usually of the gasoline type, which is drivingly coupled through its drive shaft to a hydraulic pump P. Pump P supplies a flow of fluid under pressure, from reservoir R and line 11 through line 12 to hydraulic motor M–3 and line 13 to directional control valve C. The hydraulic motor M–3 is drivingly connected through a gear reduction means GR–3 to grass-cutting blade means B in the usual manner. These blades B may be of the rotary or reel type as desired even through only rotary type blades are shown in the drawings. By-pass line 14, connected at one end between the hydraulic pump P and the hydraulic motor M–3 and at the other end between hydraulic motor M–3 and differential control valve C, provides a by-pass of hydraulic motor M–3 independent of the selected condition of the off-on valve V. If the valve V is open and permits flow through the by-pass line 14 there is insufficient power in the hydraulic motor M–3 to drive the blades B and, conversely, if the valve V does not permit full flow through the by-pass line 14 full or partial fluid pressure is directed into motor M–3 to drive the blades B.

The directional control valve C is provided with an inlet 15 in fluid communication with inlet line 13 and a pair of forward outlet and return ports 16 and 17 and a pair of reverse outlet and return ports 18 and 20. Forward outlet and return port 16 is connected by line 21 to left motor M–1, and left reverse outlet and return port 18 is connected to motor M–1 by line 22. Similarly, forward outlet and return port 17 is connected by line 23 to right motor M–1 and the right reverse outlet and return port 20 is connected to motor M–2 by line 24. Thus, it can be seen that the flow of fluid under pressure from the hydraulic pump P through inlet port 15 may be directed by the directional control valve through ports 16, 17, 18 and 20 as will be explained in detail hereinafter.

The directional control valve C is further provided with ports 25 and 26 which are interconnected by line 27 and by line 28 to the reservoir R to permit the return of fluid to the reservoir R. It is to be noted also that the hydraulic motor M–3 is connected by line 30 to the return line 28 to permit the flow of fluid from the hydraulic motor M–3 to return to the reservoir R.

Turning now to Fig. 2 it can be seen in this enlarged cross-sectional view that the directional control valve C comprises a housing 31 with a cylindrical bore 32 in which is received a cylindrical valve member or spool 33 suitably fitted therein to permit axial movement to the right or to the left (as shown in this figure) and rotatable movement about its major axis. Suitable sealing means such as 34, 35 may be provided as desired at or near each end of the housing 31 to prevent leakage. The valve member or spool 33 is also bored throughout its length and counterbored as shown at 36 and 37, respectively, into which is inserted an attaching mechanism indicated in its entirety as 38 which cooperates with the steering mechanism S to cause movement of the valve to the right or to the left according to the position of the steering wheel.

Attaching mechanism 38 comprises a pin 40 axially disposed in counterbore 37 having an enlarged end 41, a helically coiled spring 42 axially encompassing the middle portion of pin 40, and a fork-like means 43. One prong 44 is formed at one end with an enlongated slot 45 and at the other end with an inwardly extending lip portion 46 with a hole 47. The pin 40 is received in hole 47 and arranged so that lip portion 46 is inserted between the end 41 and the spring 42. The other prong 48 forming the other half of the fork-like means 43 is provided with an elongated slot 50 at one end and at the other end with an inwardly extending lip portion 51 which in turn has a hole 52 formed therein. This latter lip portion 51 and hole 52 cooperates with the other end of pin 40 and is located between lock washer 53 and spring 42. It is to be noted that the prong 48 is longer than the prong 44 so as to cooperate with opposite ends of the pin 40, and that slots 45 and 50 at the opposite end of the fork are displaced relative to each other. Thus, with the slots 45 and 50 each forming a lost motion connection with linkage means 54, it can be seen that movement of the linkage means 54 by rotation of the steering mechanism S causes prongs 43 and 48 to move relative to one another to compress the spring 42 to the right or to the left. This pin 40 is in turn fixedly attached to the spool 33 by pin 55 so that rotation of the steering wheel will ultimately move the spool to the right or to the left as desired.

The spool 33 is provided intermediate its ends with an irregularly shaped recess means or pressure area 56 formed in the outer surface thereof and located between four intercommunicative rectangularly shaped recess means or pressure areas 57, 58, 60 and 61 also formed in the outer surface thereof. The irregularly shaped recess means or area 56 comprises an elongated middle portion 62, the longest portion of which extends in the major axial direction of the spool. The enlarged middle portion 63 of this irregular recess means or area extends circumferentially substantially around the spool and is of a width greater than the width of the elongated portion 62. The irregular shaped lands 64, 65 on the valve which define the four rectangular areas and the irregularly shaped middle area 56 serve to separate the various areas from each other. It is important to note that the size or dimension of the irregular area 56 and particularly the elongated area 62 as well as the axial dimension of the rectangular areas 57, 58, 60 and 61 are so constructed and arranged to cooperate with the inlet 15 and the outlets 16, 17, 18 and 20 as well as the return pressure ports 25 and 26 to provide a variable orifice with the respective outlets and return ports the reason for which will be described in detail.

Communication between the various ports is accomplished by axial movement caused by the movement of the linkage means 43 and 54 hereinbefore described and by rotational movement of the spool by control lever L fixedly attached to the spool 33. Control lever L comprises a rod means 66 having a handle 67 formed at one end. The other end extends through a rectangularly formed slot 68 in the housing 31 so as to permit axial, forward and backward movement of the rod. In this embodiment the lever L is affixed to the spool valve proper 33 by insertion of the end of rod 66 opposite handle 67 into a radially extending slot 70 formed in the right hand side of the spool and by retaining the rod in this slot by means of a U-shaped bracket 71 apertured at each end to receive the rod. The U-shaped means is itself affixed to the spool by any convenient means such as screw means 72.

Thus with axial movement of the spool to the right or to the left being accomplished by the rotational movement of the steering wheel, or by hand under certain conditions, and with forward and backward movement of the handle 67 causing rotational movement of the spool the operator of the power lawn mower can completely control and direct the mower as will be explained, in detail, hereinafter.

Turning now again to Fig. 1, it is to be noted that lever L is in its center position. This position causes the flow of fluid pressure from the pump P to flow through line 13, inlet 15 and back through return lines 27 and 28 from return ports 25 and 26 by reason of the fact that the irregular area 56 with its elongated portion 62 is in communication with the inlet and pressure return ports 25 and 26. This is the neutral position of the power lawn mower.

Figure 7:
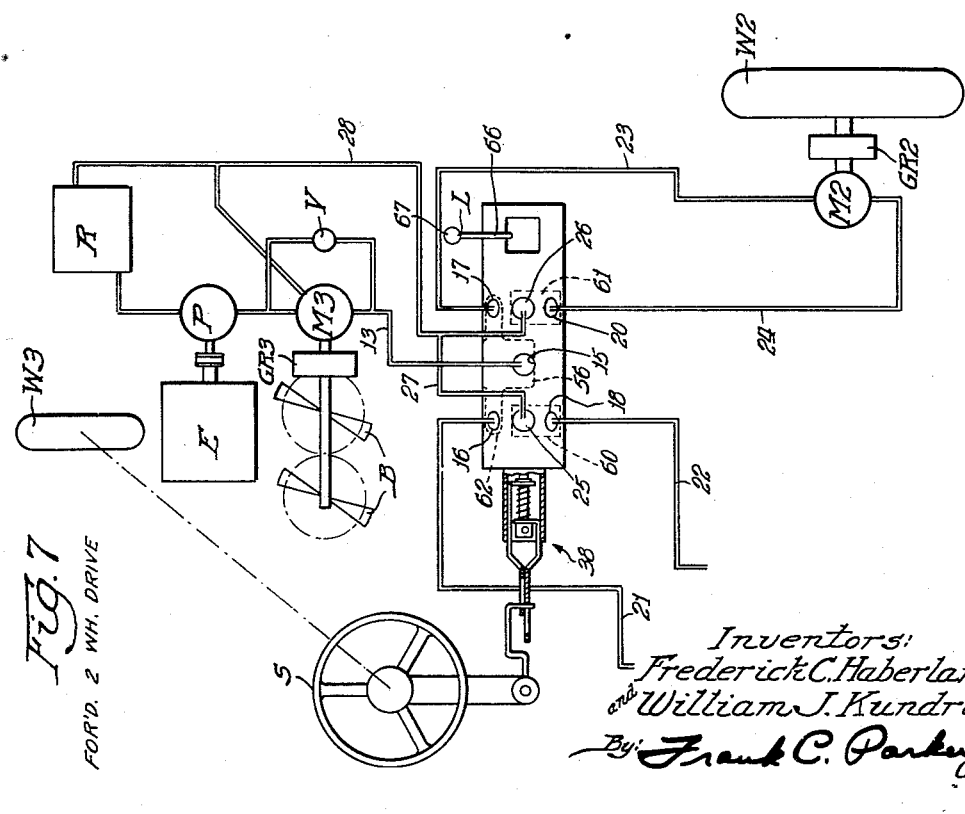
Fig. 7 is a semi-schematic, partial plan view of the power lawn mower, showing to advantage the position of the fluid pressure areas of the differential control valve as they cooperate with the inlet and outlet ports for forward movement, two wheel drive, of the power lawn mower.

If the operator decides to travel straight forward with two wheel drive, he merely has to push the lever L forward, i.e., in the direction of wheel W-3, as shown in Fig. 7, so that the pressure from line 13 and inlet port 15 is directed to the two forward outlet and return ports 16 and 17 now in communication with the inlet 15 by reason of the change of position of the irregularly shaped area 56. Fluid under pressure is then directed to lines 21 and 23, respectively, and return pressure from lines 22 and 24, communicated to return lines 27 and 28 by reason of the communication between ports 18, 25 and 20, 26, which communication is accomplished by positioning the rectangular pressure areas 60 and 61 on the valve member or spool 33.

In a similar manner two wheel drive reverse travel with two wheel drive is easily accomplished by the operator positioning the lever L directly backward (or opposite from the position of lever L in Fig. 7) as shown in Fig. 8 so that the irregular area 56 communicates pressure from the inlet port 15 to the two reverse pressure and return ports 18 and 20. In this manner fluid under pressure is communicated to lines 22 and 24, respectively, and lines 21 and 23 become return lines in communication with the return lines 27 and 28 by the intercommunication of ports 16, 25 and 17, 26 accomplished through the rectangular areas 57 and 58 of the spool valve proper.

In either of these positions of two wheel drive direct forward or reverse travel, obviously, speed control can be accomplished by intermediate positioning of lever L between fully forward or fully reverse, thus by-passing some of the flow back to the reservoir R; the amount of flow being by-passed back to the reservoir R is a function of the pressure since the by-pass ports are fixed orifices. Speed control also of course, is not a function of the valve position alone but also will depend on the load at the wheels.

By moving the spool 33 by means of lever L to the extreme right or to the extreme left as shown in Figs. 9 and 10, respectively, whether the control lever L is fully forward, fully in reverse or at any intermediate position, one wheel drive through either the left wheel W-1 or the right wheel W-2, forward or reverse direction, is accomplished. Speed control is also accomplished by partially by-passing some of the fluid under pressure back to the reservoir as explained in connection with Figs. 7 and 8.

Figs. 11 and 12 clearly illustrate the position of the spool valve as it is affected by movement of the steering wheel S through linkage means 54 and 43 to accomplish forward right and left turns of the power mower, respectively. It is important to note that either in this right or left turning position, the elongated portion 62 of the irregular pressure area 56 of the spool valve 33, as well as the extreme right or left of the rectangular areas 60 and 61, only partially uncover the ports 16, 18, 25 or 17, 26 and 20, as the case may be, for differential control of either the left or the right wheel, depending on the direction of turn. Obviously, the pressure areas in question cooperate with the respective ports to provide orifices to accomplish this differential control and the amount of orifice opening will, of course, depend on the amount of turn in the steering wheel S.

Also, it is to be noted that the one side of the areas functions to provide a variable orifice, the other side of the areas provides more flow to the hydraulic motor. Also, any steering on the part of the operator will cause flow to be by-passed back to the reservoir. Figs. 13 and 14 show differential reverse right and left turns of the power mower. Since the function of the valve is exactly the same as explained in connection with Figs. 11 and 12 except that the areas and the ports dividing the flow of fluid in the opposite direction to the hydraulic motors, no further description herein is deemed necessary.

Finally, as another accomplishment in this invention, should any one of the power wheels W-1 or W-2 start spinning causing loss of traction, traction can be restored by either turning the steering wheel to restrict the flow of fluid to the spinning wheel until traction is restored or by moving the control handle against the spring 42, the choice of these two methods being up to the operator.

While the device has been described with reference to a particular direction, it is to be understood that this is merely to facilitate the description and is not to be considered a limitation.

While this invention has been described in connection with one embodiment thereof it is to be understood that this is by way of illustration and not by way of limitation and the scope of this invention is defined solely by the appended claims would should be construed as broadly as the prior art will permit.

We claim:

1. A differential control valve comprising: a housing having a cylindrical bore and having an inlet port and a plurality of outlet ports provided therein, a valve member having an outer peripheral surface disposed in said cylindrical bore for axial and rotatable movement therein, said valve member having a first recess means and a pair of rectangular recess means provided in said outer surface, said first recess means being provided with a portion elongated in the direction of the axis of said valve member and being provided with an enlarged middle portion, all of said recess means provided in said valve member being cooperable with said outlet ports to provide flow through some of the outlet ports while preventing flow through others under certain selected conditions and to restrict the amount of flow through some of said outlet ports while permitting flow through the others under certain other selected conditions.

2. A differential control valve comprising: a housing having a cylindrical bore and having an inlet port and a plurality of outlet ports provided therein, a valve member having an outer peripheral surface disposed in said cylindrical bore for axial and rotatable movement therein, said valve member having an irregularly shaped first recess means and a pair of rectangular recess means provided in said outer surface, said first recess means being provided with a portion elongated in the direction of the axis of said valve member and being provided with an enlarged middle portion, all of said recess means provided in said valve member being cooperable with said outlet ports to provide flow through some of said outlet ports while preventing flow through others under certain selected conditions and to restrict the amount of flow through some of said outlet ports while permitting flow through the others under certain other selected conditions.

3. A differential control valve comprising: a housing having a cylindrical bore and having an inlet port and a plurality of outlet ports provided therein, a valve member having an outer peripheral surface disposed in said cylindrical bore for axial and rotatable movement therein, said valve member having a first recess means and a pair of rectangular recess means provided in said outer surface, said first recess means being provided with a portion elongated in the direction of the axis of said valve member and being provided with an enlarged middle portion being arranged to cooperate with said inlet port, all of said recess means provided in said valve member being cooperable with said outlet ports to provide flow through some of said outlet ports while preventing flow through others under certain selected conditions and to restrict the amount of flow through some of said outlet ports while permitting flow through the others under certain other selected conditions.

References Cited in the file of this patent

UNITED STATES PATENTS

| | | |
|---|---|---|
| 832,518 | Wolcott | Oct. 2, 1906 |
| 2,202,216 | Madsen | May 28, 1940 |
| 2,547,254 | Braithwaite | Apr. 3, 1951 |
| 2,601,752 | Rose | July 1, 1952 |
| 2,609,650 | Lindquist | Sept. 9, 1952 |
| 2,704,131 | Vahs | Mar. 15, 1955 |
| 2,738,849 | Nubling | Mar. 20, 1956 |
| 2,765,611 | King | Oct. 9, 1956 |
| 2,766,572 | Vogelaar | Oct. 16, 1956 |
| 2,766,834 | Boyer | Oct. 16, 1956 |